April 8, 1930.                L. S. WILBUR                1,753,762
                          SPLICE BAR OR FISHPLATE
                   Filed April 12, 1929      8 Sheets-Sheet 3

April 8, 1930.  L. S. WILBUR  1,753,762
SPLICE BAR OR FISHPLATE
Filed April 12, 1929   8 Sheets-Sheet 4

Inventor:
Lawrence S. Wilbur
By Arthur F. Durand
Atty.

April 8, 1930.   L. S. WILBUR   1,753,762
SPLICE BAR OR FISHPLATE
Filed April 12, 1929   8 Sheets-Sheet 5

April 8, 1930. L. S. WILBUR 1,753,762
SPLICE BAR OR FISHPLATE
Filed April 12, 1929 8 Sheets-Sheet 7

Inventor:
Lawrence S. Wilbur
By
Arthur F. Durand
Atty.

Patented Apr. 8, 1930

1,753,762

UNITED STATES PATENT OFFICE

LAWRENCE S. WILBUR, OF EVANSTON, ILLINOIS, ASSIGNOR TO NATIONAL RAIL JOINT CORPORATION, A CORPORATION OF ILLINOIS

SPLICE BAR OR FISHPLATE

Application filed April 12, 1929. Serial No. 354,492.

This invention relates to angle bars or splice bars, sometimes called fish plates, such as those employed on rail joints. These splice bars become worn and distorted in use, by the pounding of the wheels as they pass over the joints, and by the creeping of the rails, owing to expansion and contraction of the rails. Therefore, it is customary to tighten the bolts of the joints from time to time, in order to take up any wear or distortion of the splice bars, so that the bars will firmly engage the sides of the rails. In addition, when the splice bars or fish plates become worn so badly that they can no longer be properly tightened against the rails, these bars are then collected and reformed or reshaped, and such reformed or reshaped bars may be made suitable for use on either new or old rails.

Generally stated, the object of the invention is to provide a splice bar or fish plate which is normally curved or bowed inwardly at its middle, when viewed from above, either at the top or bottom, or both, whereby when the bar is flexed and straightened, or partially straightened, by the tightening of the rail joint bolts, the middle portion of the bar will tend to spring inwardly and thereby automatically take up wear between the bar and the rails, either on new rails or old rails, and with either new bars or old bars that have been reformed or reshaped.

It is also an object to provide certain details and features of construction and combinations tending to increase the general efficiency and the desirability of splice bars or fish plates of this particular character.

To the foregoing and other useful ends, the invention consists in the matters hereinafter set forth and claimed, and shown in the accompanying drawings, in which,—

Figure 1:
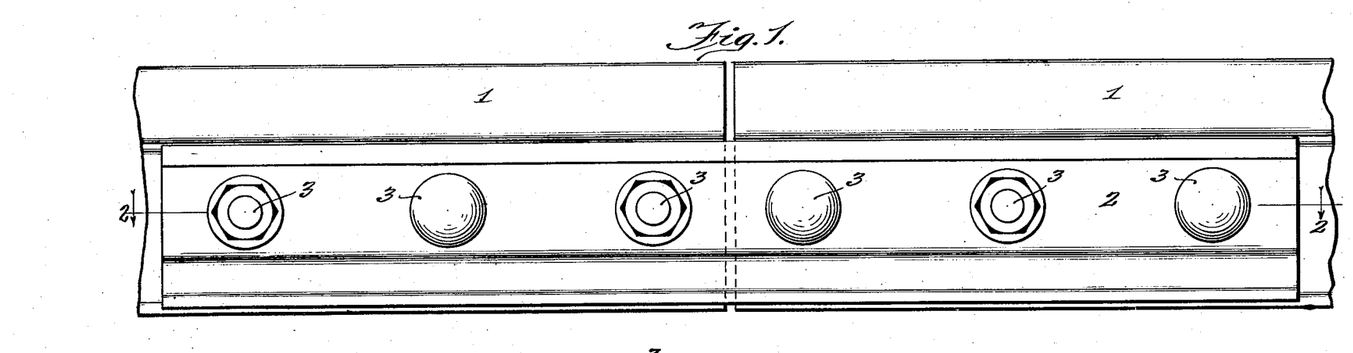
Fig. 1 is a side elevation of a rail joint having splice bars embodying the principles of the invention, it being assumed that the rails are new rails, or rails that have not been worn and distorted, and it being also assumed that the splice bars are either new ones or old ones made over.
Figure 2:
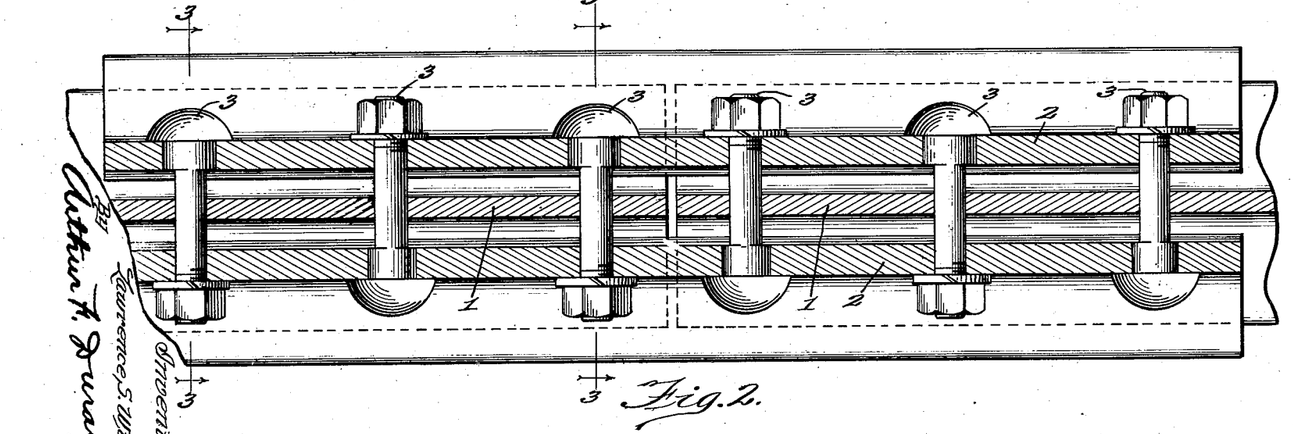
Fig. 2 is a horizontal longitudinal section on line 2—2 in Fig. 1.
Figures 3, 5, 6, 8:
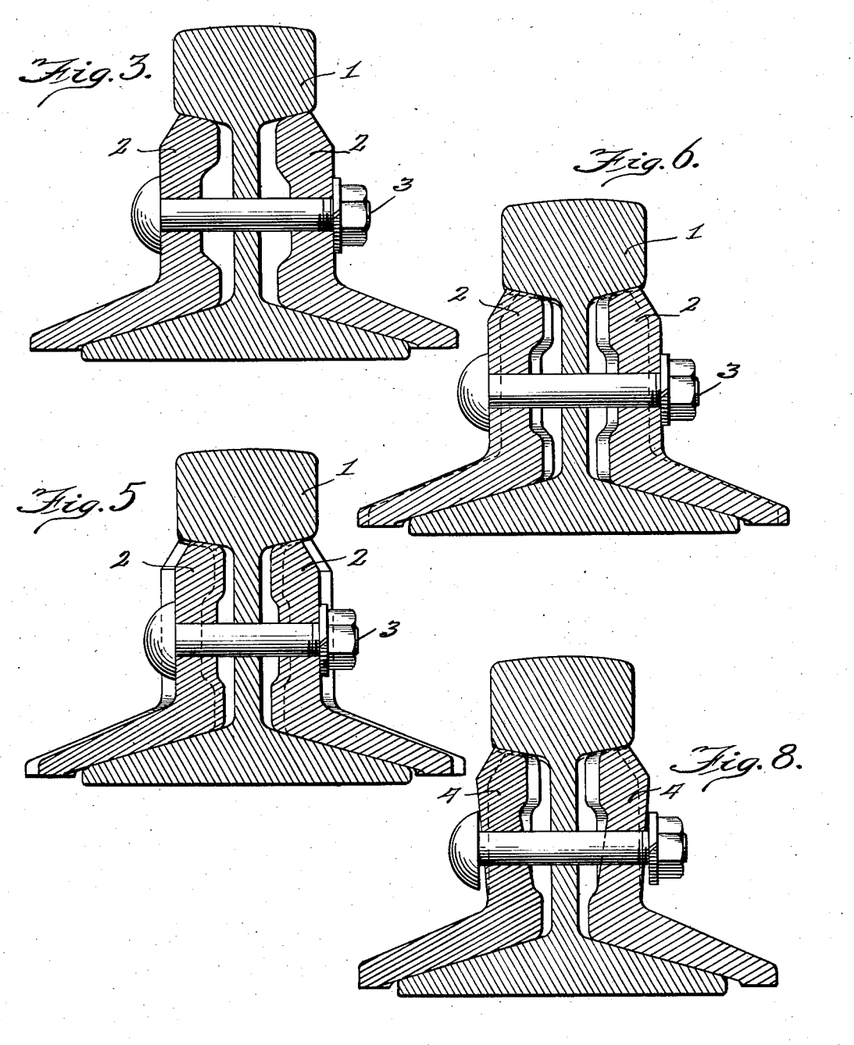
Fig. 3 is a vertical transverse section on either of the two lines 3—3 in Fig. 2.
Fig. 5 is a vertical transverse section on line 5—5 in Fig. 4.
Fig. 6 is a vertical transverse section on line 6—6 in Fig. 4.
Fig. 8 is a vertical transverse section on line 8—8 in Fig. 7.
Figure 4:
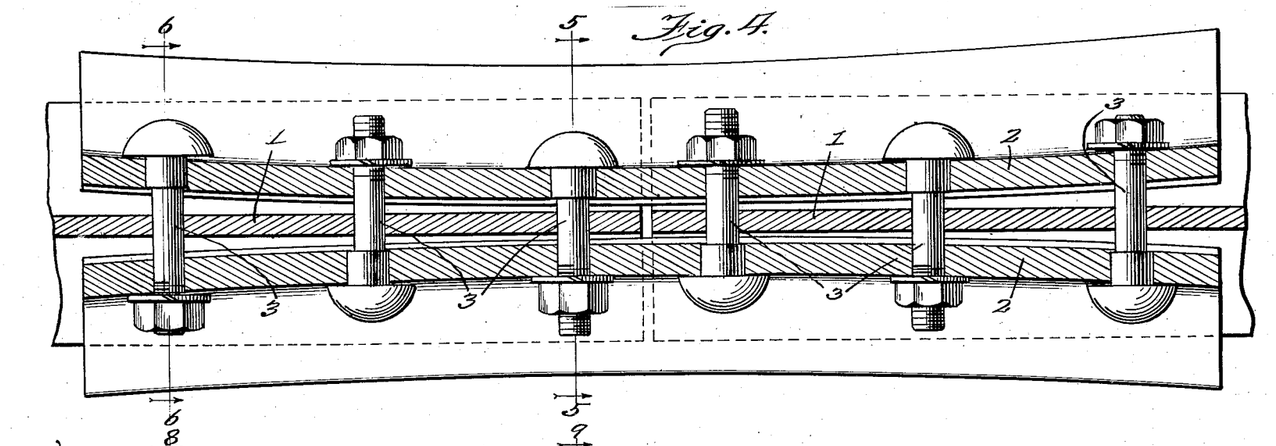
Fig. 4 is a view similar to Fig. 2, showing the condition of the splice bars when in use on badly worn and distorted rails.
Figure 7:
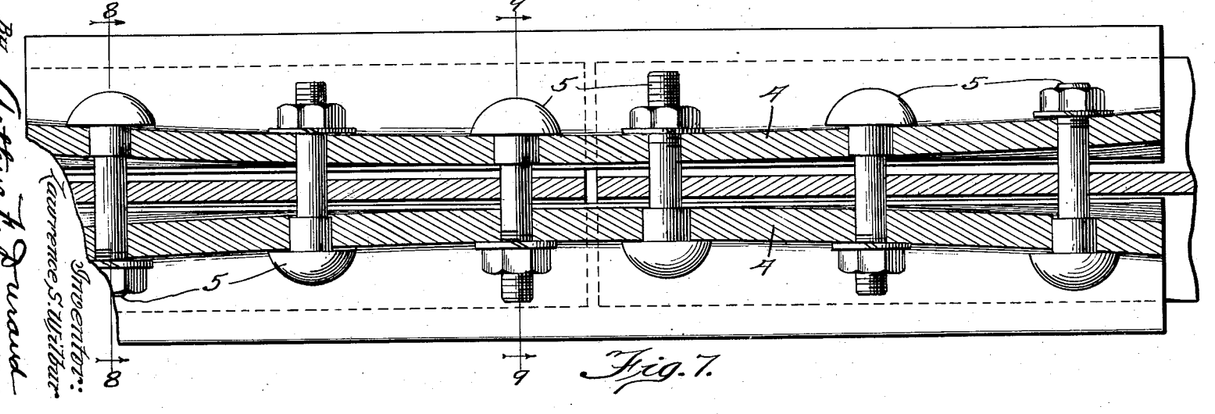
Fig. 7 is a view similar to Fig. 4, but showing a different shape for the splice bars, illustrating a different form of the invention.
Figures 9, 10, 11:
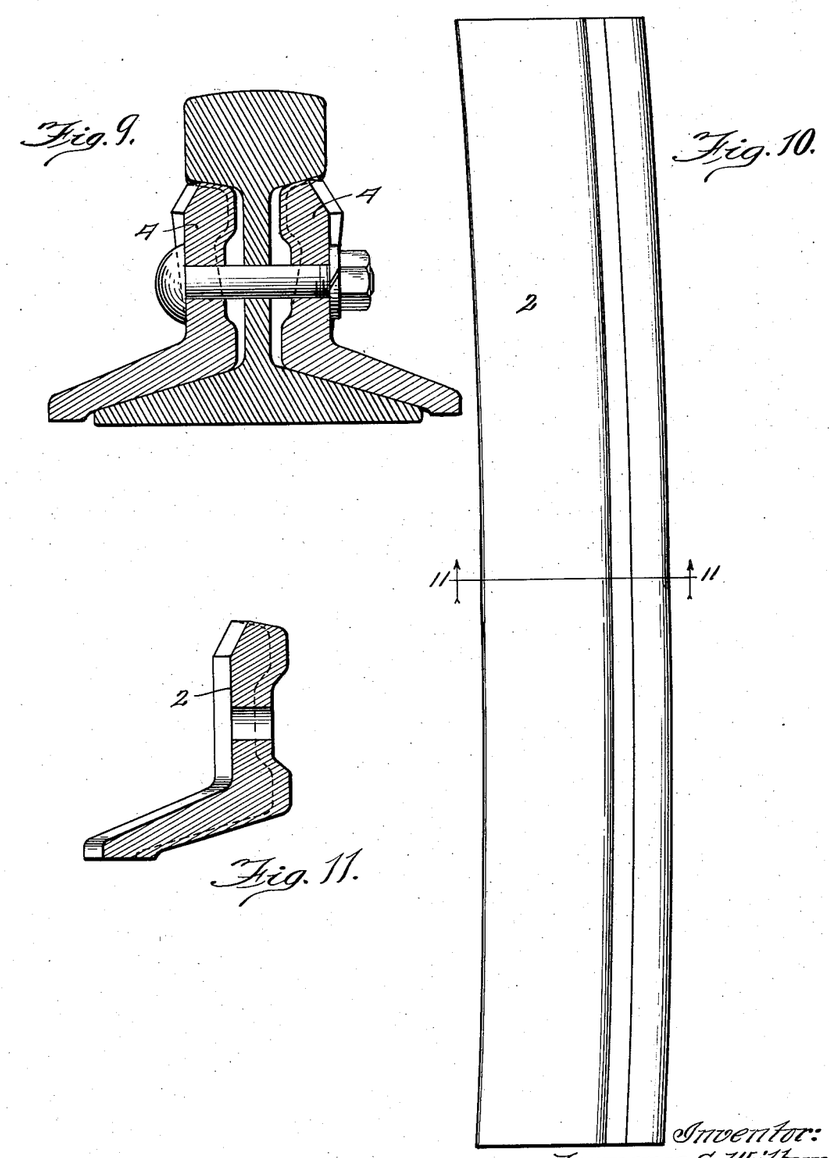
Fig. 9 is a vertical transverse section on line 9—9 in Fig. 7.
Fig. 10 is a plan view of one of the splice bars shown in Figs. 1, 2 and 4 of the drawings.
Fig. 11 is a vertical transverse section on line 11—11 in Fig. 10.

As thus illustrated, and referring to Figs. 1, 2, 3, 4, 5, 6, 10 and 11, the invention comprises the rails 1, which may be any ordinary new rails, as shown. The splice bars 2 are formed as shown, being normally curved inwardly at the middle when viewed from above, as shown more clearly in Fig. 10 of the drawings. Consequently, when the bolts 3 are properly tightened, the splice bars are straightened out, as shown in Fig. 2 of the drawings, when used on new rails, or on old rails which are not deformed, whereby the splice bars 2 are under tension, with the result that the middle portion of each bar tends constantly to spring inwardly, thereby to automatically take up wear between the bars and the rails. It is well known that the rails become worn and deformed more at their ends, over the middle portion of the joint, than at the ends of the splice bars, whereby the take-up is usually greater at the middle portion of a splice bar than at the ends thereof. Figs. 4, 5 and 6 show the condition of the splice bars 2 when used on old rails which have been badly deformed by the pounding of the car wheels. In such case, the bars are sprung inwardly at the middle of each bar, as shown in Fig. 4, and as indicated in Figs. 5 and 6 of the drawings, whereby to provide each splice bar with proper contact with the rails throughout the length of the bar at top and bottom thereof.

Figures 12, 13, 14, 15:
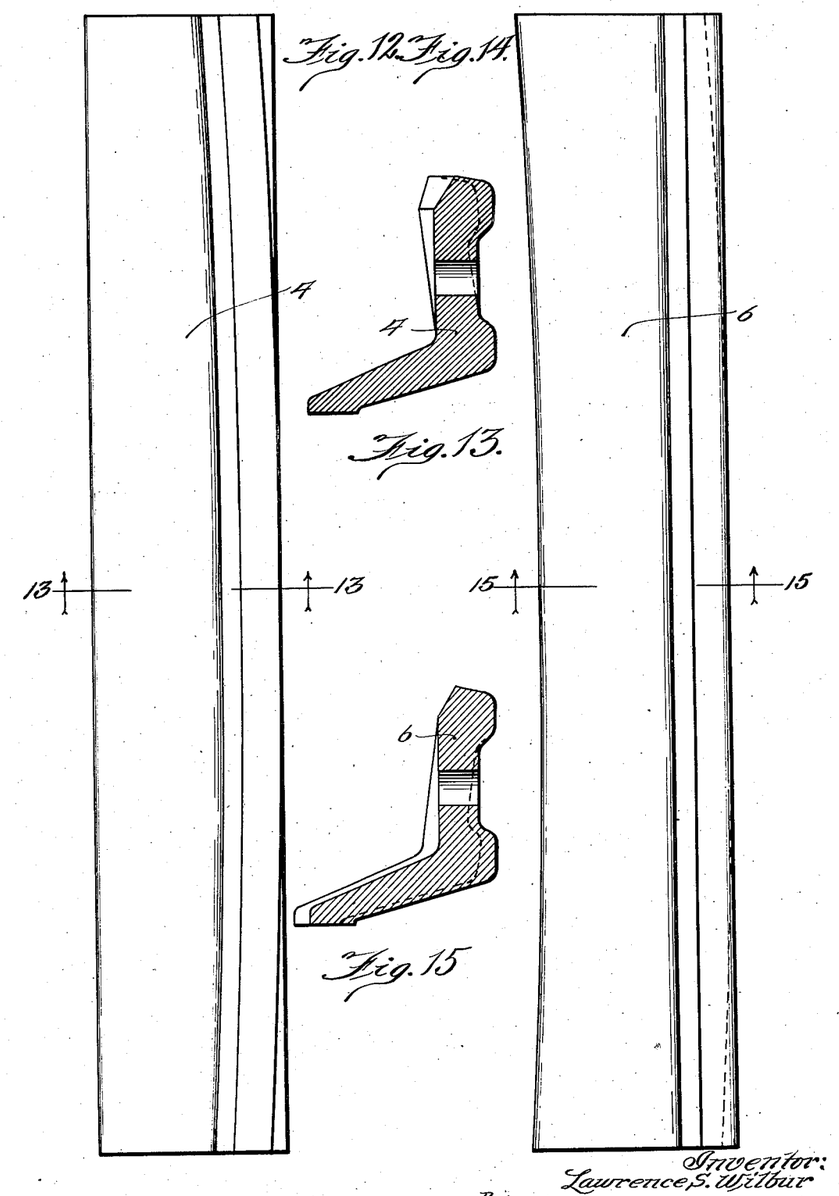
Fig. 12 is a plan view of one of the splice bars shown in Fig. 7.
Fig. 13 is a vertical transverse section on line 13—13 in Fig. 12.
Fig. 14 is a view similar to Fig. 12, showing a different form of the invention.
Fig. 15 is a vertical transverse section on line 15—15 in Fig. 14.

In Figs. 7, 8, 9, 12 and 13, the splice bars or fish plates 4 are sprung and curved only at the top of each bar, as shown in Figs. 12 and 13, with the result that, when the bolts 5 are tightened properly, the end portions of the top and vertical web of each bar will spring inwardly, on new rails, until the top of the bar is straight, as well as the bottom thereof, when viewed from above. When the bars 4 are used on old rails that have become more or less deformed or distorted by the pounding of the car wheels, the middle top portions of the two bars 4 will spring inwardly and remain curved, when viewed from above, whereby to provide each bar with firm seating engagement at top and bottom thereof throughout the length of each bar.

Figure 16:
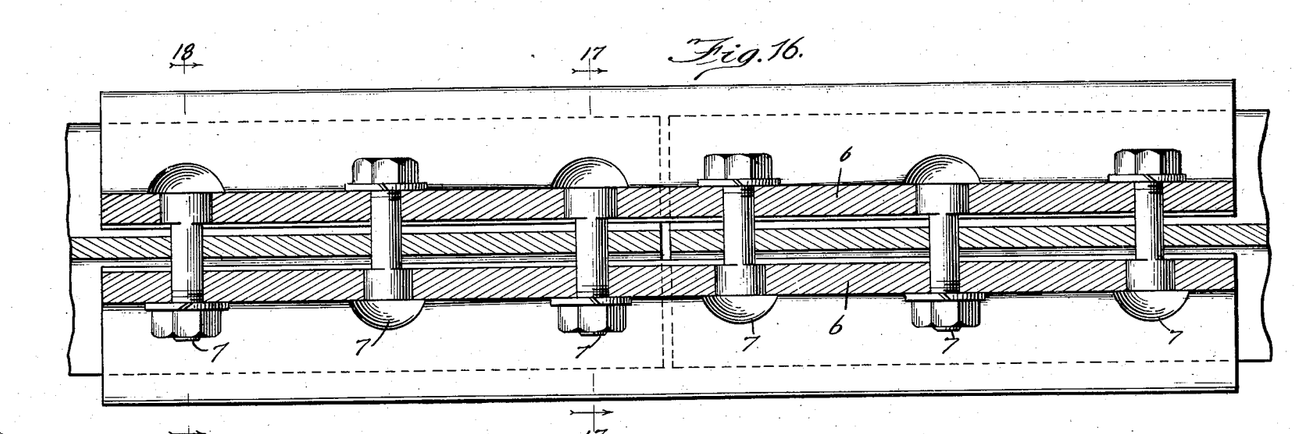
Fig. 16 is a horizontal longitudinal section through a rail joint having splice bars of the kind shown in Figs. 14 and 15, except that in Fig. 16 each splice bar is crowned or humped, whereby the middle portion of the bar is of greater height than the end portions thereof.

In Figs. 14, 15, 16, 17 and 18, the splice bars or fish plates 6 are curved or sprung only at the bottom thereof, as shown in Fig. 14 and as indicated in Fig. 15, whereby, when the bolts 7 are tightened, the end portions of the bottom flange of each splice bar will be flexed inwardly until the bottom of each bar is straight, when viewed from above, when the bars are used on new rails or on rails that are not badly deformed or distorted. In this way the middle portion of the bottom of each splice bar tends constantly to spring inwardly, and thus automatically take up wear. In Fig. 16, the bolts 7 have been tightened until each splice bar 6 is straight throughout the length thereof, at both top and bottom, while in Figs. 17 and 18 the bars are shown in curved condition, as might be the condition of these bars when used on old rails. The tops of the bars 6 can be level, or they can be humped or crowned at the middle, so that the bar will be of greater height at its middle than at the ends thereof, and such a bar can be used either on new or old rails, but is more especially adapted for use on old rails that have been deformed or distorted by the pounding of the car wheels until the fishing height has become greater at the ends of the rails than at the ends of the splice bars. In Figs. 14 and 15, the splice bars are indicated as being level on top, but in Figs. 17 and 18 these splice bars are shown as having greater height at the middle than at the ends thereof. But, in any event, in accordance with this form of the invention, the splice bar is straight at its top, when viewed from above, normally, but is curved at its bottom, as shown, whereby the bottom portion of the bar may be placed under tension which will tend constantly to make the lower portion of the bar spring inwardly at its middle, thereby automatically to take up wear.

Figure 19:
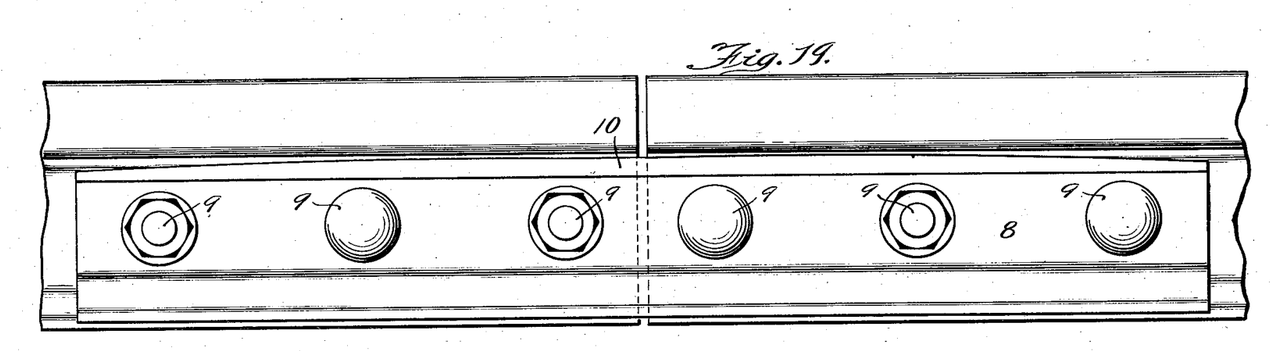
Fig. 19 is a side elevation similar to Fig. 1, but showing the bar humped or crowned at the middle, so that it is higher at the middle than at the ends of the bar.
Figure 20:
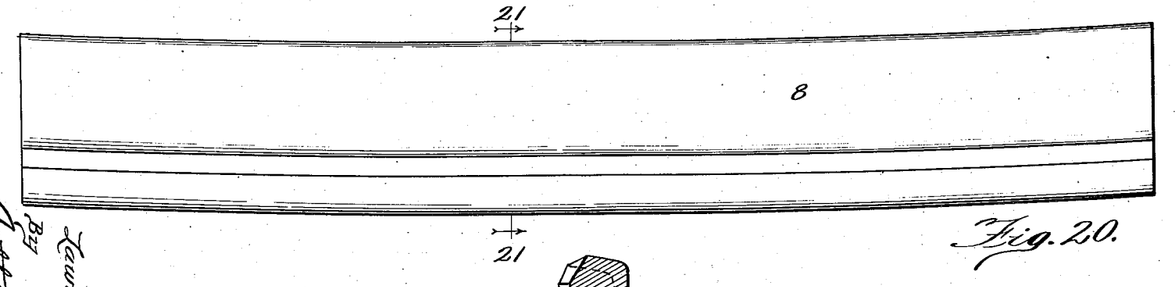
Fig. 20 is a plan view of the splice bar shown in Fig. 19.
Figure 21:
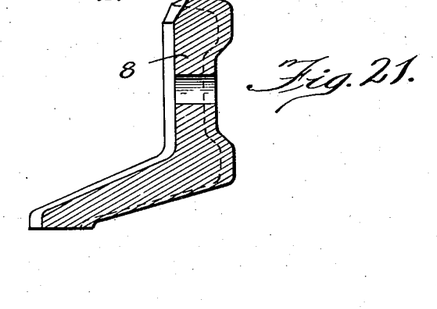
Fig. 21 is a vertical transverse section on line 21—21 in Fig. 20, it being understood that the bar shown in Figs. 19, 20 and 21 is adapted more especially for use on old rails, although it may be used also on new rails, as the bar will flex inwardly at its ends until both the top and bottom of the bar have full engagement with the rails throughout the length of the bar, when the bolts are properly tightened.

In Figs. 19, 20 and 21, the splice bar 8 is curved at top and bottom, as shown in Fig.

20, so that the entire bar is normally curved, when viewed from above. Also, in this case, the top of the bar is humped or crowned at the middle, as indicated in Figs. 19 and 21, so that the bar is higher at its middle than at the ends thereof. Thus, when the bolts 9 are tightened, on either new or old rails, the end portions of the splice bars of this kind are sprung inwardly toward the rails, thereby placing the middle portion of each splice bar under tension, whereby each bar tends constantly to spring inwardly at its middle, thereby serving automatically to take up wear. Because the bar is humped or crowned at its middle 10, as shown in Fig. 19, the bar is especially adapted for use on old rails that have become deformed or distorted by the pounding of the car wheels, so that the fishing height has become greater at the ends of the rails than at the ends of the splice bar.

Figure 22:
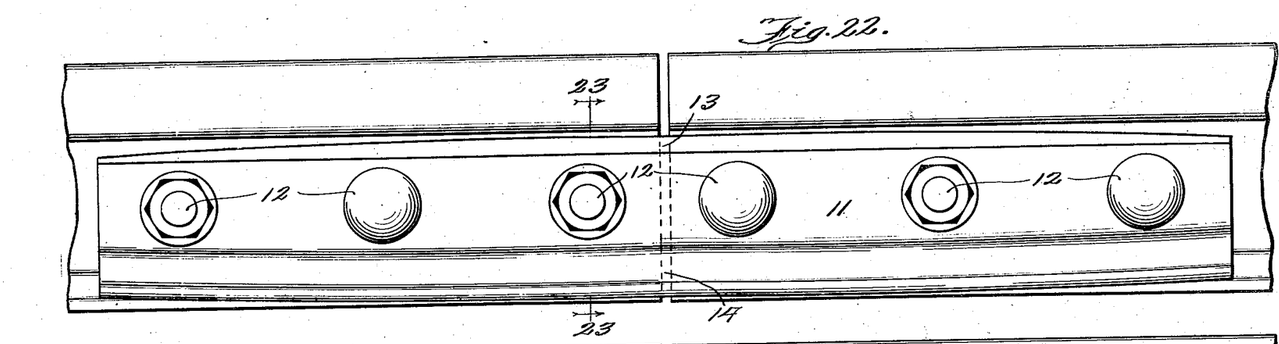
Fig. 22 is a view similar to Fig. 19, but showing the bar humped or crowned at both top and bottom, so that the bottom of the bar is higher at the ends of the bar than at the middle thereof, a bar of this kind being especially adapted for old rails, although it is possible to use the bar on new rails.
Figures 23, 24, 25:
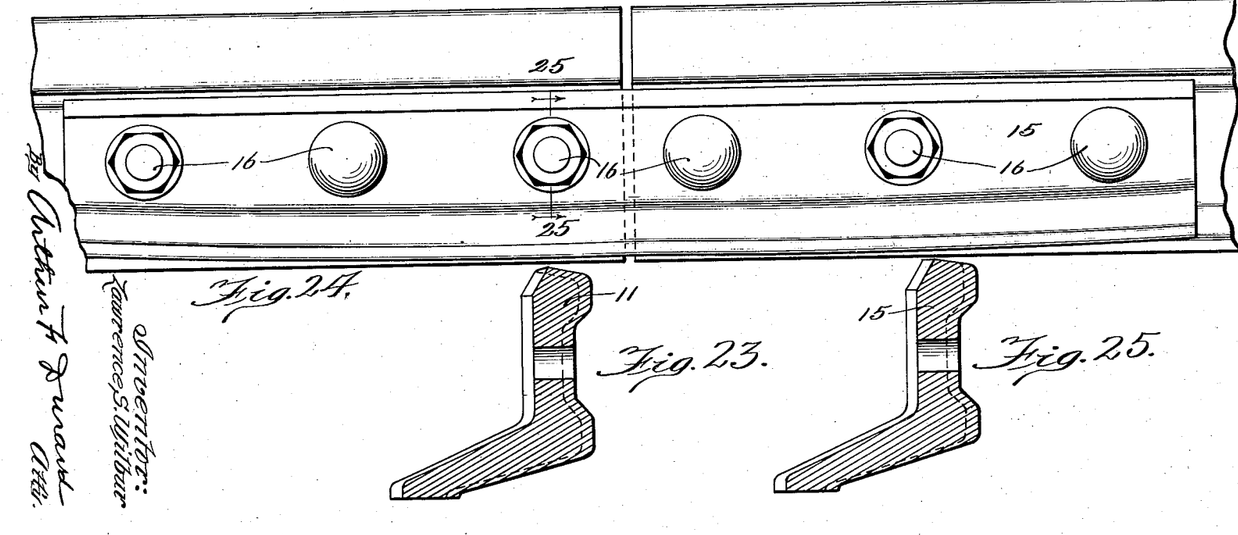
Fig. 23 is a transverse vertical section of the bar shown in Fig. 22, on line 23—23.
Fig. 24 is a view similar to Fig. 22, showing the splice bar straight or level on top, and humped or crowned on its bottom, whereby the bottom of the bar is higher at the ends than at the middle thereof.
Fig. 25 is a transverse vertical section of the bar shown in Fig. 24, on line 25—25.

In Figs. 22 and 23, the splice bar 11 is curved at the top and bottom thereof, when viewed from above, whereby the end portions of the bar spring inwardly when the bolts 12 are tightened, as previously explained. However, in this case, the bar is crowned at both the top and bottom, at the middle portion 13 of the top, and at the middle portion 14 of the bottom, whereby the bar is higher at its middle than at its ends, and whereby the depth of the bar is greater at its middle than at its ends, the ends of the bottom being higher than the middle of the bottom of the bar. A bar of this kind is especially adapted for use on old rails that have become badly deformed or distorted by the pounding of the car wheels so that the fishing height has become considerably greater at the ends of the rails than at the ends of the splice bars. However, it would be possible to use bars of this kind on new rails, as in such case the ends of each bar would spring inwardly or be forced inwardly, necessarily, to a greater extent than when used on old rails, thereby to provide proper engagement for both the top and bottom of the bar, with the rails, throughout the length of the bar.

In Figs. 24 and 25 of the drawings, the bar 15 is shown as being curved throughout its length, at both top and bottom, when viewed from above, so that its middle is bowed or bulged inwardly. In this case the top of the bar is shown as being level and straight, when viewed horizontally from the side, whereas the bottom of the bar is crowned or humped downwardly at the middle of the bar, in the manner described in connection with Fig. 22 of the drawings. In this way the top of the bar 15 is level, but the bottom is higher at its ends than at its middle, whereby the depth of the bar is greater at the middle than at its ends. A bar of this kind is especially adapted for use on old rails, where the fishing height has become greater at the ends of the rails than at the ends of the splice bar; but a bar of this kind can also be used on new rails, by properly adjusting or tightening the bolts 16 to cause the tops and bottoms of the splice bars to properly engage the rails throughout the length of each bar.

From the foregoing, therefore, it will be seen that splice bars or fish plates are provided, illustrative of the invention, for use on either new or old rail joints. In each form of the invention shown and described, the splice bar is normally under tension when in use on a rail joint, the ends of the bar having been flexed inwardly, either at the top or bottom, or both, whereby the middle portion of the bar, either at the top or bottom, or both, tends constantly to spring inwardly toward the rails, thereby serving automatically to take up wear between the bars or fish plates and the rails. As previously stated, and as is well known, the pounding of the car wheels on the rails as they pass over a joint, tends to mash the end portions of the upper treads of the rails, so that in side elevation these treads become tapered toward the edges of the rails, in a well known manner. Also, the lower flanges of the rails tend to bend downwardly, so that the fishing height becomes gradually greater at the ends of the rails than at the ends of the splice bars. Therefore, the adjustment of the bolts to take up wear is necessary with the ordinary fish plate or splice bar; but with a bar curved or bulged or bowed inwardly at its middle, when viewed from above, as shown and described, and with the bar flexed or placed under tension, as described, the middle portion of the bar will tend constantly to spring inwardly, and thus automatically keep both the top and the bottom of the bar in firm engagement with the rails throughout the length of the bar. With spring washers, such as the ordinary washers 17, shown in the various views, between the nuts of the bolts and the outer sides of the splice bars or fish plates, the bolts will remain tight at the middle of the splice bar, even though such middle portion of the bar has moved inwardly to some extent toward the rails. Afterward, when the rail joints are inspected, and when the nuts of the bolts are again turned as far as possible, these spring washers will assume their normal or flat condition. Therefore, and while the splice bar or fish plate may be humped or crowned at its top, or level, or may be humped or crowned or level on its bottom, it is true that in each and every form of the invention shown and described, the bar has an inwardly curved or inwardly bowed middle portion, whereby, when the bolts are properly tightened to draw the ends of the bar inwardly and into alignment with the middle portion thereof, more or less, the middle portion of the bar is thus placed under tension, in the manner and for the purpose described. In some cases, the initial application of the splice bar or fish plate, as the use thereof on new rails, with the bar humped or crowned at the top or bottom, or both, will involve more flexing or bending, or bending to an extent that will make the bar bow or curve outwardly, so that the ends of the bar will be closer to the sides of the rails than the middle portion of the bar. In some cases, when a bar is applied to old rails, the ends of the bar may not be forced inwardly far enough to bring them into alignment with the middle portion of the bar, but, nevertheless, there will be enough flexing and consequent tension to accomplish the automatic taking up of wear, more or less, as described. Of course, when the rails are so badly worn and distorted that no flexing or tensioning of the bar can be obtained, with a bar which is straight on its top and bottom when viewed horizontally from the side, a more or less humped or crowned bar must be employed, in order to get the flexing or tensioning of the bar. When the rails and the bars become worn and distorted by use, to the extent that further tightening or adjusting of the bar does not accomplish or obtain firm engagement of the bar with the rails, throughout the entire length of the top and bottom of the bar, then the bar or bars must be taken off and reformed or reshaped, in any suitable or desired manner, and by any suitable or desired method and apparatus.

The splice bars or fish plates shown and described may be either new bars or old bars which have been reformed and reshaped. Preferably, however, the bars shown and described are old bars which have been reformed or reshaped. New splice bars or fish plates are usually made by cutting up long lengths of straight stock, so that each bar is originally perfectly straight from end to end, not only when viewed from above, but also when viewed horizontally from the side. Consequently, while it would be possible to make new bars or fish plates of the kind shown and described, it would probably be less expensive, at least under present conditions and with the present practice, to produce the bars shown and described from old and worn or distorted bars, by using die mechanism of any suitable character for reforming or reshaping the bars in the desired manner.

It will be seen that the different splice bars shown and described can be used in one and the same structure, as any two of the bars can be used on the same rail joint, depending upon the worn or distorted condition of the rails, or on a series of rail joints.

Figure 17:
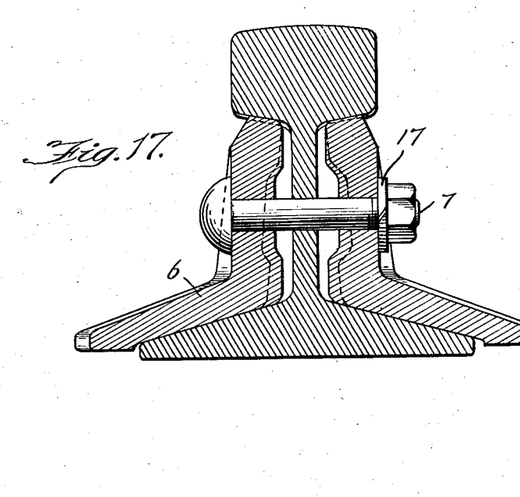
Fig. 17 is a vertical transverse section on line 17—17 in Fig. 16.
Figure 18:
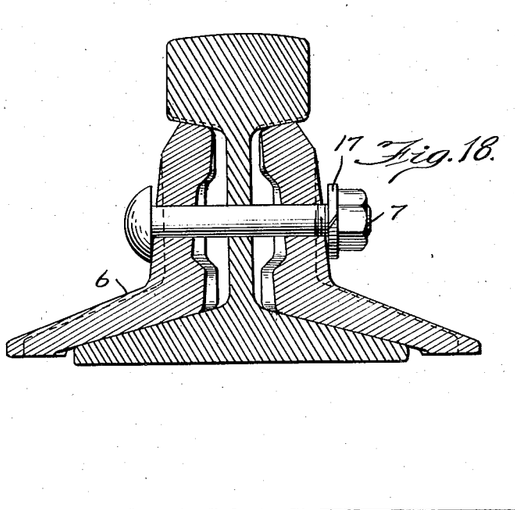
Fig. 18 is a vertical transverse section on line 18—18 in Fig. 16, it being observed that in Figs. 14, 15, 16, 17 and 18, each splice bar is normally straight at its top and curved at its bottom, Figs. 17 and 18 illustrating the condition of the splice bars before their ends are drawn inwardly by the tightening of the bolts, whereby, when in use on old rails and properly tightened thereon, the bottom of each bar will be straight, as well as the top thereof, thus causing the middle portion of each bar to tend constantly to spring inwardly and automatically take up wear, and Fig. 16 showing the condition of the bars when pulled in at their ends so that they are then straight both at top and bottom.

In each case the bar has a bottom flange, such as the flange 6 in Figs. 17 and 18, which is inclined downwardly at its outer edge. In other words, the bottom flange is tilted so that its outer edge is lower than its inner edge. Hence, when the ends of the bar are pulled inwardly, this flange tends to tilt downwardly at its outer edge, and to thus assure a more oblique angle than usual, and to thereby bear down on the flange of the rail. This is inherent in the structure shown and described.

In the form of the invention in which the bar is level or straight on top, as well as on the bottom, when the bar is viewed horizontally from the side, and in which the bar is curved or bowed inwardly at its middle, when viewed from above, the height of the bar throughout its length may be greater than usual. For example, when an old and worn splice bar is reformed or made over, it can be given a greater height than it originally had. A splice bar of this kind can be used to advantage on old rails, where the fishing height of the rails has been increased at the ends of the rails, by the pounding of the car wheels. In such case, the middle portion of the bar will fit the sides of the worn or distorted rail ends, and when the bolts are tightened the bar will not be entirely straightened, inasmuch as the fishing height has remained normal on the rails at the ends of the bar. Of course, should a splice bar of this kind, of greater height than normal throughout its length, be used on new rails, it would straighten out entirely, but it would not set into the rails as far as would the ordinary splice bar. Such a bar, of course, can be curved at top or bottom, or at both top and bottom, in the manner shown and described.

Thus it will be seen that with the splice bar or fish plate flanged at its lower edge, as shown in each form of the invention, the top of the bar or plate is more flexible (toward and away from the rails) than the base or foot of the bar or fish plate. This is essential to the invention and is true of each form of the invention shown, and it will be seen that the bar can be curved to fit either worn rails or new rails, and may be formed from an old splice bar or from fresh or new metal, as may be desired.

What I claim as my invention is:

1. A rail joint comprising a splice bar or fish plate having a relatively wide bottom formed with an outer flange, whereby the top of the bar is more flexible than the bottom, and having its top portion curved or bowed inwardly at its middle, when viewed from above, so that when the bar is tightened on the rail joint the ends of the bar are forced inwardly toward the rails, placing the bar under tension, whereby the middle portion of the bar will tend constantly to spring inwardly toward the rails.

2. A rail joint having a splice bar or fish plate as specified in claim 1, said bar having its top humped or crowned at the middle, so that the middle is higher than the ends of the bar.

3. A rail joint having a splice bar or fish plate as specified in claim 1, said bar being humped or crowned on its bottom at the middle of the bar, whereby the bar is of greater depth at its middle than at the ends of the bar.

4. A rail joint having a splice bar or fish plate as specified in claim 1, said bar being straight and level on its top and bottom, when the bar is viewed horizontally from the side, and the bar being over-sized vertically and therefore of greater height than ordinary or usual throughout its length.

5. A structure as specified in claim 1, said bar being curved inwardly at its middle to fit worn rails.

6. A structure as specified in claim 1, said bar being formed to remain straight on new or unworn rails and formed to spring inwardly at its middle portion when the rail ends become worn or distorted in service.

7. A structure as specified in claim 1, said bar being of uniform fishing height throughout the length thereof, but fitting the rails closer at its central portion than at its ends when applied to worn rails.

8. A structure as specified in claim 1, said flange being tilted downward at its outer edge, so that it forms an obtuse angle with the body of the bar, whereby this flange tends to move downward when the ends of the bar are pulled inwardly toward the rails.

9. A rail joint comprising a splice bar or fish plate having a relatively wide bottom formed with an outer flange, whereby the top of the bar is more flexible than the bottom, and having its bottom portion curved or bowed inwardly at its middle, when viewed from above, so that when the bar is tightened on the rail joint the ends of the bar are forced inwardly toward the rails, placing the bar under tension, whereby the middle portion of the bar will tend constantly to spring inwardly toward the rails.

10. A rail joint having a splice bar or fish plate as specified in claim 9, said bar having its top humped or crowned at the middle, so that the middle is higher than the ends of the bar.

11. A rail joint having a splice bar or fish plate as specified in claim 9, said bar being humped or crowned on its bottom at the middle of the bar, whereby the bar is of greater depth at its middle than at the ends of the bar.

12. A rail joint having a splice bar or fish plate as specified in claim 9, said bar being straight and level on its top and bottom, when the bar is viewed horizontally from the side, and the bar being over-sized vertically and therefore of greater height than ordinary or usual throughout its length.

13. A structure as specified in claim 9, said bar being curved inwardly at its middle to fit worn rails.

14. A structure as specified in claim 9, said bar being formed to remain straight on new or unworn rails and formed to spring inwardly at its middle portion when the rail ends become worn or distorted in service.

15. A structure as specified in claim 9, said bar being of uniform fishing height throughout the length thereof, but fitting the rails closer at its central portion than at its ends when applied to worn rails.

16. A structure as specified in claim 9, said flange being tilted downward at its outer edge, so that it forms an obtuse angle with the body of the bar, whereby this flange tends to move downward when the ends of the bar are pulled inwardly toward the rails.

17. A rail joint comprising a splice bar or fish plate having a relatively wide bottom formed with an outer flange, whereby the top of the bar is more flexible than the bottom, and having both its top and bottom portions curved or bowed inwardly at the middle of the bar, when viewed from above, so that when the bar is tightened on the rail joint the ends of the bar are forced inwardly toward the rails, placing the bar under tension, whereby the middle portion of the bar will tend constantly to spring inwardly toward the rails.

18. A rail joint having a splice bar or fish plate as specified in claim 17, said bar having its top humped or crowned at the middle, so that the middle is higher than the ends of the bar.

19 A rail joint having a splice bar or fish plate as specified in claim 17, said bar being humped or crowned on its bottom at the middle of the bar, whereby the bar is of greater depth at its middle than at the ends of the bar.

20. A rail joint having a splice bar or fish plate as specified in claim 17, said bar being straight and level on its top and bottom, when the bar is viewed horizontally from the side, and the bar being oversized vertically and therefore of greater height than ordinary or usual throughout its length.

21. A structure as specified in claim 17, said bar and flange being curved inwardly at its middle to fit worn rails, the inner and outer edges of said flange being parallel when the bar is straight.

22. A structure as specified in claim 17, said bar being formed to remain straight on new or unworn rails and formed to spring inwardly at its middle portion when the rail ends become worn or distorted in service.

23. A structure as specified in claim 17, said bar being of uniform fishing height throughout the length thereof, but fitting the rails closer at its central portion than at its ends when applied to worn rails.

24. A structure as specified in claim 17, said flange being tilted downward at its outer edge, so that it forms an obtuse angle with the body of the bar, whereby this flange tends to move downward when the ends of the bar are pulled inwardly toward the rails.

25. A rail joint having a splice bar or fish plate as specified in claim 1, the bottom of the bar being straight when viewed from above.

26. A rail joint having a splice bar or fish plate as specified in claim 9, the top of the bar being straight when viewed from above.

Specification signed this 5th day of April, 1929.

LAWRENCE S. WILBUR.